United States Patent

Haaland

(10) Patent No.: US 6,720,028 B1
(45) Date of Patent: Apr. 13, 2004

(54) IMPREGNATED CERAMIC CORE AND METHOD OF MAKING

(75) Inventor: Rodney S. Haaland, Morristown, TN (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 09/818,950

(22) Filed: Mar. 27, 2001

(51) Int. Cl.$^7$ .............. B05D 3/02; B05D 1/18
(52) U.S. Cl. ........... 427/133; 427/385.5; 427/430.1; 427/443.2
(58) Field of Search ............... 427/133, 385.5, 427/430.1, 443.2

(56) References Cited

U.S. PATENT DOCUMENTS

| | | | |
|---|---|---|---|
| 3,688,832 A | 9/1972 | Horton | 164/72 |
| 3,973,070 A | * 8/1976 | Ingram, II | 428/220 |
| 4,269,256 A | 5/1981 | Nakazawa et al. | 164/16 |
| 4,605,594 A | 8/1986 | Owens et al. | 428/373 |
| 4,626,567 A | 12/1986 | Chang | 524/493 |
| 4,639,283 A | * 1/1987 | Nakamura | 156/89.13 |
| 4,664,948 A | 5/1987 | Moore et al. | 427/134 |
| 4,693,986 A | 9/1987 | Vit et al. | 501/1 |
| 4,921,038 A | 5/1990 | Sasaki et al. | 164/516 |
| 4,925,492 A | 5/1990 | Kelkar et al. | 106/38.35 |
| 4,939,191 A | 7/1990 | Kataoka et al. | 524/5 |
| 5,073,591 A | 12/1991 | Tsaur | 524/460 |
| 5,308,910 A | 5/1994 | Yuki et al. | 524/503 |
| 5,331,039 A | 7/1994 | Blum et al. | 524/507 |
| 5,371,133 A | 12/1994 | Stanley | 524/457 |
| 5,389,582 A | 2/1995 | Loxley et al. | 501/4 |
| 5,460,854 A | 10/1995 | Krug | 427/393.6 |
| 5,468,285 A | 11/1995 | Kennerknecht | 106/38.3 |
| 5,851,933 A | * 12/1998 | Swartz et al. | 428/141 |
| 5,900,463 A | 5/1999 | Tanimoto et al. | 525/61 |
| 5,939,505 A | 8/1999 | Kukkala | 526/202 |
| 5,955,532 A | * 9/1999 | Chang et al. | 524/504 |
| 6,031,045 A | 2/2000 | Wei et al. | 524/840 |
| 6,083,005 A | 7/2000 | Taub | 433/215 |
| 6,117,518 A | 9/2000 | Cawse et al. | 428/116 |
| 6,152,211 A | 11/2000 | Klug et al. | 164/518 |
| 6,286,582 B1 | 9/2001 | Chartier et al. | 164/28 |

FOREIGN PATENT DOCUMENTS

FR   2785836   5/2000

OTHER PUBLICATIONS

Japanese Patent abstract of JP 52–66507, Derwent, Jun. 1977.*

* cited by examiner

*Primary Examiner*—Michael Barr

(57) ABSTRACT

An impregnated fired, porous ceramic core for use in an investment casting shell mold in the casting of molten metals and alloys is strengthened by impregnating the core with an aqueous emulsion of water-insoluble polymer followed by drying to remove the water.

13 Claims, 1 Drawing Sheet

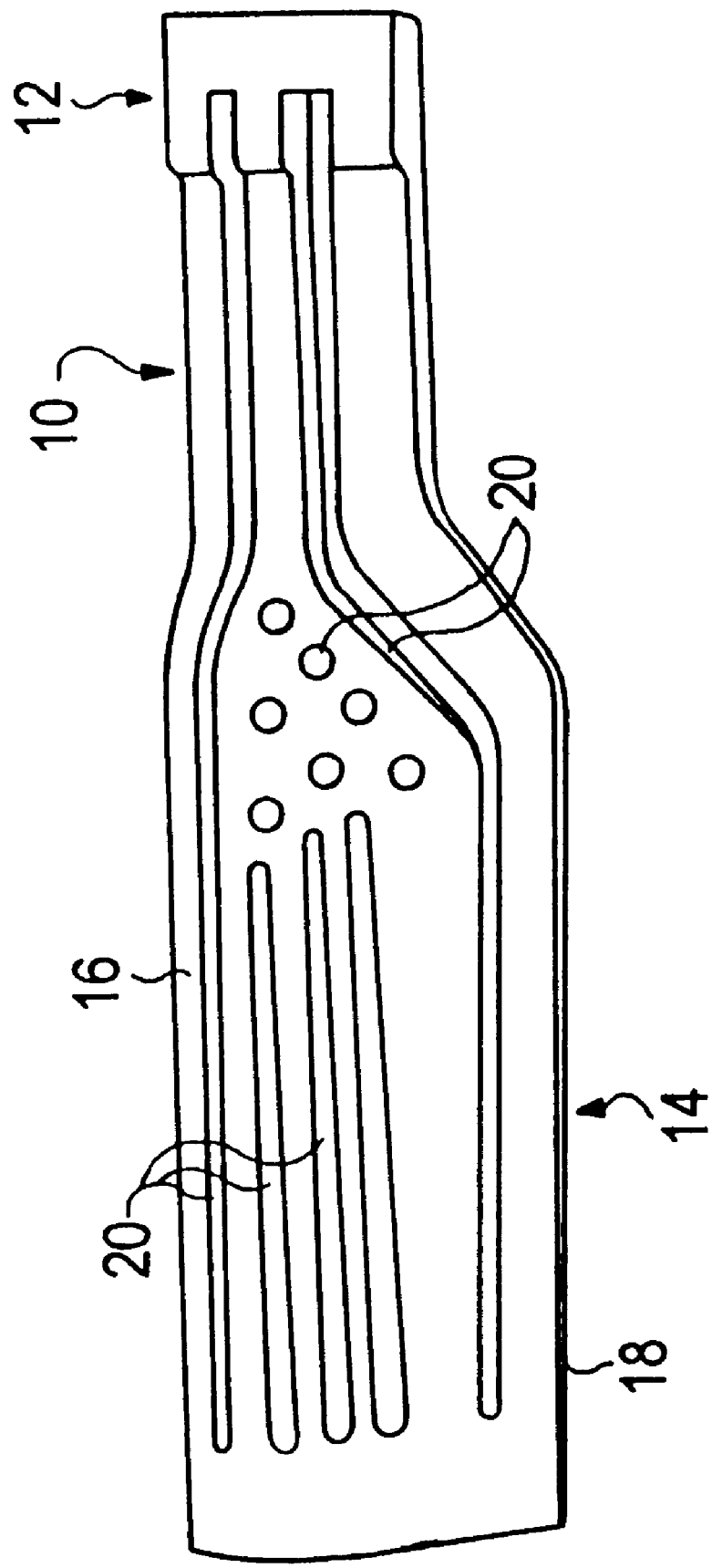
FIGURE

IMPREGNATED CERAMIC CORE AND METHOD OF MAKING

FIELD OF THE INVENTION

The present invention relates to impregnated fired ceramic cores for use in investment casting of metallic materials and a method of increasing strength of such cores.

BACKGROUND OF THE INVENTION

In casting hollow gas turbine engine blades and vanes (airfoils) using conventional equiaxed and directional solidification techniques, a fired ceramic core is positioned in an investment shell mold to form internal cooling passageways in the airfoil. During service in the gas turbine engine, cooling air is directed through the passageways to maintain airfoil temperature within an acceptable range.

The fired ceramic cores used in investment casting of hollow turbine engine airfoils typically have an airfoil shape with a quite thin cross-section trailing edge region. Such ceramic cores can be prone to distortion and loss of the required dimensional tolerance during core manufacture and subsequent steps of the investment casting process such as wax pattern injection about the fired core and steam autoclaving of the shell mold to selectively remove the wax pattern.

Green (unfired) ceramic cores typically are formed to desired core configuration by injection molding, transfer molding or pouring of an appropriate ceramic core material that includes one or more ceramic powders, a fugitive binder such as wax, polyproplylene, polyolef in, prehydrolized ethyl silicate, and other additives into a suitably shaped core die. After the green core is removed from the die, it is subjected to firing at elevated (superambient) temperature in one or more steps to remove the fugitive binder and sinter and strengthen the core for use in casting metallic material, such as a nickel or cobalt base superalloy. As a result of removal of the binder and fugitive filler material, if present, the fired ceramic core is porous.

Attempts have been made to further strengthen the fired, porous ceramic core. For example, the fired, porous ceramic core can be impregnated with an aqueous solution of a water-soluble phenolic formaldehyde resin followed by a 300–400 F. degree oven bake to set the phenolic resin. Use of the water-soluble phenolic formaldehyde resin solution as an impregnating medium is disadvantageous as a result of reduction of the impregnation strengthening effect imparted by the water-soluble resin in the presence of atmospheric moisture, such as water and steam, that may be present in the core manufacturing and foundry environment. That is, the strengthening effect imparted by the water-soluble resin is degraded in the presence of atmospheric moisture. The use of the water-soluble phenolic formaldehyde resin solution as an impregnating medium is also disadvantageous from the standpoint of presenting environmental and health concerns with respect to the formaldehyde resin. Cores impregnated with the water-soluble phenolic formaldehyde resin solution can exhibit dimensional distortion during the oven baking operation.

An object of the present invention is to provide an impregnated fired ceramic core and method of strengthening the fired core while overcoming the above-noted disadvantages.

SUMMARY OF THE INVENTION

An embodiment of the present invention provides an impregnated fired porous ceramic core for use in an investment shell mold in the casting of molten metals and alloys wherein the core is impregnated with an aqueous emulsion of a water-insoluble polymer followed by drying to remove the water.

The impregnated fired porous core pursuant to the invention exhibits a greater strength increase than achieved by the water-soluble phenolic formaldehyde resin impregnated core after oven baking, and the strength increase so imparted is more resistant to degradation in the presence of atmospheric moisture.

In a particular embodiment of the present invention, the water-insoluble polymer is selected from the group consisting of acrylic, styrene butadiene, polyvinyl acetate, styrene acrylic, vinyl acetate acrylic, vinyl-vinylidene chloride, epoxy, polyvinyl butyrol, polyurethane and other water-insoluble polymers.

A particularly preferred aqueous emulsion comprises about 10% to 50% by weight of an acrylic polymer and balance essentially water where the acrylic polymer is self cross-linkable. An even more preferred aqueous emulsion comprises about 15% to 30% by weight of the acrylic polymer and balance essentially water. The acrylic polymer preferably has a $T_g$ (glass transition temperature) from 15 to 40 degrees C. The aqueous emulsion can include the addition of minor amounts of constituents to reduce foaming, enhance wetting, and/or improve polymer cross-linking.

The invention provides a fired, porous ceramic core for use in investment casting including water-insoluble polymer solids in pores of the core, the polymer preferably being present in an amount of about 0.2% to about 5% by weight of the core.

The above objects and advantages of the present invention will become more readily apparent from the following detailed description taken with the following drawing.

DESCRIPTION OF THE DRAWINGS

The FIGURE is a perspective view of a fired, porous ceramic core for a gas turbine airfoil that can be made pursuant to the invention.

DETAILED DESCRIPTION OF THE INVENTION

The invention provides an impregnated ceramic core especially useful in casting of hollow gas turbine engine blades and vanes (airfoils) using conventional equiaxed and directional solidification techniques. However, the invention is not limited to ceramic cores for use in investment casting of airfoils as any other fired, porous ceramic core can be strengthened by practice of the invention. For purposes of illustration and not limitation, the FIGURE shows a fired, porous ceramic core 10 for use in investment casting a hollow gas turbine blade where the core has a configuration of internal cooling passages to be formed in the blade casting. The core 10 includes a root region 12 and an airfoil region 14. The airfoil region 14 includes a leading edge 16 and trailing edge 18. Openings or slots 20 of various configurations and dimensions can be provided through the core 10 to form elongated walls, rounded pedestals and other features in the interior of the cast blade as well known.

The ceramic core 10 is formed by preparing a mixture of one or more suitable ceramic powders (flours), a fugitive binder and other constituents such as one or more fugitive filler materials, dispersants, plasticizers, lubricants and other constituents. The binder can be either an organometallic liquid, such as prehydrolized ethyl silicate, a thermoplastic wax-based binder, or a thermosetting resin mixed with the ceramic powder(s) in appropriate proportions to form a ceramic powder/binder mixture for molding to shape. The ceramic powders can be blended using a conventional V-cone blender, pneumatic blender, or other such blending equipment. The binder can be added using conventional high-shear mixing equipment at room temperature or elevated temperature. The ceramic powders may comprise alumina, silica, zirconia, zircon, yttria, and other powders and mixtures thereof suitable for casting a particular metal or alloy. U.S. Pat. No. 4,837,187 describes an alumina based ceramic core made from alumina and yttria flours. The particular ceramic powders, fugitive binder and other constituents of the ceramic powder/binder mixture form no part of the invention as conventional ceramic powder and binder systems can be used to form the ceramic core.

The ceramic core can be formed by conventional injection molding, transfer molding, or pouring employed to make green ceramic cores. For example only, in injection molding a ceramic core shape, a fluid ceramic powder/binder mixture is injected into a steel core die having a molding cavity having the core configuration desired. Injection pressures in the range of 500 psi to 2000 psi are used to pressurize the fluid ceramic/binder mixture in the molding cavity defined by the dies. The dies may be cooled, held at room temperature, or slightly heated depending upon the complexity of the desired core configuration. After the ceramic/binder mixture solidifies in the die, the die is opened, and the green, unfired ceramic core is removed for thermal processing to remove the fugitive binder and sinter the green ceramic core to form a fired, porous ceramic core 10 to be used in the well known lost wax investment casting process. Sintering achieves consolidation of the ceramic powder particles by heating to impart strength to the core for use in the investment casting process. Sintering of the green ceramic core is achieved by means of heat treatment to an elevated temperature based on the requirements of the ceramic powders employed. Above U.S. Pat. No. 4,837,187 describes thermal processing of an alumina based ceramic core. The particular core forming technique, such as injection molding, transfer molding and pouring, and the particular thermal processing technique form no part of the invention as conventional core molding techniques and thermal processing techniques can be used to make the fired, porous ceramic core which is strengthened pursuant to the invention.

The present invention strengthens the fired, porous ceramic core 10 by impregnating the core with an aqueous emulsion of water-insoluble polymeric material followed by drying (e.g. in ambient air at room temperature or using superambient forced air at for example 200 degrees F.) to remove the water. The impregnated fired, porous core pursuant to the invention exhibits a greater strength increase than achieved by the water-soluble phenolic formaldehyde resin impregnated core after oven baking described hereabove. Moreover, the strength increase so imparted by practice of the invention is more resistant to degradation in the presence of atmospheric moisture as will become apparent.

The aqueous emulsion of the water-insoluble polymer is typically produced by commercial manufacturers by a process known as emulsion polymerization. This process usually involves mixing water, a liquid monomer, a stablizer, and an initiator under high shear agitation at a tightly controlled temperature. The result is a stable suspension of liquid polymeric particles in water. The aqueous emulsion useful in practice of the invention can comprise a commercially available aqueous emulsion of the desired polymer type, solids content and $T_g$ (glass transition temperature). In an embodiment of the invention, the commercially available aqueous emulsion can be used as-received or may be diluted with water to the desired solids content where solids content is a measurement of polymer content after removing the water from the emulsion. The water-insoluble polymer can be selected from the group consisting of acrylic, styrene butadiene, polyvinyl acetate, styrene acrylic, vinyl acetate acrylic, vinyl-vinylidene chloride, epoxy, polyvinyl butyrol, polyurethane and other water-insoluble polymers.

When dried to remove all water, the aqueous emulsion useful in practice of the invention yields a dried polymer having zero or near zero (e.g. less than 1% by weight) solubility in water at room temperature (e.g. 20 degrees C.) for 1 hour and less than 5% by weight in boiling water for 1 hour. For example, when so dried, Rhoplex HA-16 acrylic latex described below yielded a dried polymer that exhibited a 0.16% by weight solubility in stirred room temperature (20 degrees C.) water for 1 hour and a 0.51% by weight solubility in boiling water for 1 hour where the % by weight is the percent of the dried polymer that dissolves in water. When so dried, Rhoplex HA-12 acrylic latex described below yielded a dried polymer that exhibited a 0.27% by weight solubility in stirred room temperature (20 degrees C.) water for 1 hour and a 0.77% by weight solubility in boiling water for 1 hour where the % by weight is the percent of the dried polymer that dissolves in water. When so dried, styrene butadiene latex available as Tycac 68010-01 from Reichold Chemicals Company, Research Triangle Park, North Carolina 27709-3582 yielded a dried polymer that exhibited a 0.15% by weight solubility in stirred room temperature (20 degrees C.) water for 1 hour and a 4.51% by weight solubility in boiling water for 1 hour where the % by weight is the percent of the dried polymer that dissolves in water.

In contrast, when a 10% by weight polyvinyl alcohol (PVA) solution without cross-linker is dried to remove all water, the dried PVA not cross-linked exhibited 62.17% by weight solubility in stirred room temperature (20 degrees C.) water for 1 hour. When a 10% by weight polyvinyl alcohol (PVA) solution with glyoxal cross-linker is dried to remove all water, the dried PVA cross-linked using glyoxal exhibited 20.34% by weight solubility in stirred room temperature water for 1 hour. The dried PVA cross-linked and not cross-linked with glyoxal both exhibited 100% solubility in boiling water for 1 hour.

Advantageously and preferably, the invention can be practiced using an aqueous emulsion consisting of one or more water-insoluble polymers and balance essentially water with a minor amount of a defoaming agent, optional wetting agent (surfactant), and antimicrobial agent also preferably present. That is, there is no need for a cross-linker or for a PVA constituent in the aqueous emulsion in order to achieve the benefits of the invention.

An aqueous emulsion of the water-insoluble polymer for use practicing an illustrative embodiment of the invention can comprise about 10% to about 60% by weight of a water-insoluble polymer and the balance essentially water.

An aqueous emulsion pursuant to a preferred embodiment of the invention comprises about 10% to 50% by weight of one or more acrylic polymers and balance essentially water with a minor amount of defoaming agent (e.g. 50 parts per million (ppm) by weight) and antimicrobial agent (e.g. 50 ppm by weight). An even more preferred aqueous emulsion comprises about 15% to 30% by weight of one or more acrylic polymers and balance essentially water with a minor amount of defoaming agent and antimicrobial agent.

However, the aqueous emulsion optionally may include up to 10% by weight water-soluble polyvinyl alcohol and a cross linker for the water-insoluble polymer and water-soluble polymer. A preferred cross-linker comprises a dialdehyde such as glyoxal ($C_2H_2O_2$). Other cross-linkers can be selected from aldehydes including, but not limited to, dialdehyde, gluteraldehyde, hydroxyadipaldehyde, thermal setting resins such as urea-formaldehyde, melamineformaldehyde, polyamide resins, and salts of multivalent anions. Catalysts optionally can be present in the aqueous emulsion and can include, but are not limited to, ammonium nitrate and oxalic acid to accelerate cross-linking reaction when acrylic latex is used.

In practicing the invention, a preferred polymer is provided by an acrylic latex that is self cross-linkable. Such an acrylic latex is available from Rohm & Haas Company, 100 Independence Mall West, Philadelphia, Pa., 19106 as Rhoplex HA-16 acrylic latex having a $T_g$ of 35 degrees C. and % acrylic solids of 45.5% by weight. This acrylic latex can be purchased in the form of an aqueous acrylic latex (emulsion). The $T_g$ (glass transition temperature) of a particular acrylic polymer preferably is the range of 15 to 40 degrees C. since $T_g$ determines the temperature at which the dried impregnating material softens.

Another self-cross-linking acrylic latex that can be used in the invention is available from Rohm & Haas Corporation as Rhoplex HA-12 having a $T_g$ of 19 degrees C. and 45.0% by weight acrylic solids. This acrylic latex can be purchased in the form of a drum of aqueous acrylic latex (emulsion).

Table I below describes constituents of three formulations pursuant to embodiments of the invention offered for purposes of illustrating but not limiting the invention. In Table I, the numbers for Examples 1, 2, and 3 represent grams of each constituent.

TABLE I

| Materials | Example 1 | Example 2 | Example 3 |
|---|---|---|---|
| Rhoplex HA-16 Acrylic Latex | 300 | 200 | 100 |
| Water | 300 | 400 | 369 |
| Airvol 203 PVA | | | 30 |
| Glyoxal crosslinker | | | 1 |
| GEO 8034 Defoamer | 0.025 | 0.025 | 0.025 |

The aqueous emulsion is made by adding the listed acrylic latex (as-received latex) to distilled water. The optional PVA must be added to the water as a solid and dissolved prior to adding the latex. The listed PVA is commercially available as Airvol 203 PVA from Air Products and Chemicals, Inc., 7201 Hamilton Boulevard, Allentown, Pa. 18195. The optional cross-linker can be added to the water in liquid form and is commercially available as Glyoxal 40 cross-linking agent available-from Clariet Corporation, 400 Monroe Road, Charlotte, N.C. 28205. The defoaming agent can be added to the water in liquid form and is commercially available as GEO 8034 defoamer from GEO Specialty Chemicals Corporation, 701 Wissshickon Avenue, Cedartown, Ga. 30125. In practice of the invention, an antimicrobial agent typically also is present and is added to the water in liquid form and is commercially available as Kathon LX antimicrobial agent from the Rohm & Haas Company.

The constituents of the formulation can be mixed with a conventional propeller mixer for 30 minutes to desired consistency. The acrylic latex (or other polymer latex) is mixed with an appropriate amount of water to provide a desired weight percent of the water-insoluble polymer in the final formulation. The fired, porous cores can be impregnated by immersion in the aqueous emulsion of the invention for an appropriate time (e.g. 5 minutes)

The following Example is offered to further illustrate the invention.

EXAMPLE 4

Fired, porous silica-based core testbars having dimensions of 5 inches length, ½inch width and ¼inch thickness were made by conventional injection molding and transfer molding and then, after firing, were impregnated with various impregnants pursuant to the invention and outside the invention as shown in Table II. The core testbars were impregnated by immersion for 5 minutes in the impregnant under ambient pressure and air blown with compressed shop air (e.g. 30 psi air) to remove excess impregnant before baking or drying. The impregnated core testbars then were tested for modulus of rupture (MOR) at room temperature using a four point bending load pursuant to ASTM standard 674-77. An unimpregnated fired, porous silica-based core testbar was included for comparison.

For example, fired, porous silica-based core testbars (12 testbars) were impregnated with an aqueous solution of a water-soluble phenolic formaldehyde resin (25 weight % resin in water) outside the invention followed by a 400 F. degree oven bake for 90 minutes to set the phenolic resin. In Table II, these testbars are designated "Phenolic Resin".

Similar fired, porous silica-based core testbars (12) were impregnated with an aqueous solution of water-soluble Airvol 203 PVA (10 weight % PVA in water) outside the invention and dried by convection drying at 90 degrees C. for 1 hour. In Table II, these testbars are designated "10% PVA".

Similar fired, porous silica-based core testbars (12) were impregnated pursuant to the invention with an aqueous emulsion including 22.5% by weight acrylic polymer and balance water (by diluting Rhoplex HA-16 acrylic latex as in Example 1). The impregnated testbars were dried by convection drying at 90 degrees C. for 1 hour. In Table II, these testbars are designated "23% Acrylic Latex".

Similar fired, porous silica-based core testbars (12) were impregnated pursuant to the invention with an aqueous emulsion including 11.5% by weight acrylic polymer, 5% by weight of water soluble Airvol 203 PVA and balance water (by diluting Rhoplex HA-16 acrylic latex). The impregnated testbars were dried by convection drying at 90 degrees C. for 90 minutes. In Table II, these testbars are designated "11.5% Latex+5% PVA".

Table II sets forth the MOR results (MOR values set forth in psi-pounds per square inch).

TABLE II

MOR Values for Core Testbars Impregnated With Various Impregnants

| Impregnation Treatment | Injection Molded Core | Transfer Molded Core |
|---|---|---|
| None | 1322 | 2400 |
| Phenolic Resin | 1881 | 2916 |
| 11.5% Latex + 5% PVA | 3720 | 3952 |
| 23% Acrylic Latex | 3668 | 4339 |
| 10% PVA | 3743 | 3904 |

It is apparent that impregnation of the fired, porous core test bars pursuant to the invention (see "23% Acrylic Latex" testbar and "11.5% Latex+5% PVA" testbar) substantially improved the MOR as compared to the MOR of the unimpregnated "NONE" core testbar and the "Phenolic Resin" testbar. The strength increase was comparable to that achieved by impregnating the testbar with aqueous solution of water-soluble PVA (see "10% PVA").

Various impregnated core testbars of the type described above were subjected to pressurized steam at 250 degrees F. in a cabinet for 30 minutes to determine resistance to degradation of impregnated core strength in the presence of steam.

Table III sets forth the steam exposure results. In Table III, the "10% PVA" testbar was impregnated with 10% by weight PVA/water solution as described above. The "10% PVA+Crosslinker" testbar was impregnated with 10% by weight PVA/0.4% by weight crosslinker (glyoxal) in aqueous solution in a manner similar to the "10% PVA" testbar. The "Phenolic Resin" test bar was impregnated with 25 weight % water-soluble phenolic formaldehyde resin/water solution as described above. The "23% Acrylic Latex" testbar was impregnated with an aqueous emulsion including 22.5% by weight acrylic polymer and balance water as described above pursuant to the invention.

TABLE III

Percent Reduction in Testbar MOR after Pressurized Steam

| Impregnation Treatment | Percent Reduction |
|---|---|
| 10% PVA | 48.2% |
| 10% PVA + Crosslinker | 20.8% |
| Phenolic Resin | 29.5% |
| 23% Acrylic Latex | 1.6% |

Table III indicates that the MOR strength of the core testbar impregnated pursuant to the invention ("23% Acrylic Latex") exhibited only a 1.6% loss of MOR after steam exposure. In contrast, the other core testbars impregnated with impregnants outside the invention exhibited substantial decreases in MOR; namely, a 20.8% decrease in MOR for the "10% PVA+Crosslinker" testbar, a 29.5% decrease in MOR for the "Phenolic Resin" testbar, and a 48.2% decrease in MOR for the "10% PVA" testbar.

The impregnated fired, porous core testbars pursuant to the invention exhibited a substantial increase in MOR with the increased strength imparted to the core being substantially more resistant to degradation in the presence of atmospheric steam than the other impregnated testbars outside the invention.

The invention provides a fired, porous ceramic core for use in investment casting including water-insoluble polymer solids in pores of the core. The amount of polymer solids in the core pores will depend on the density (porosity) of the core. The polymer solids preferably are present in an amount of about 0.2% to about 5% by weight of the ceramic core. For example, when an acrylic latex is used as described above, the core will include acrylic polymer solids in an amount of 0.2 to 5% by weight of the core.

Although the invention has been described with respect to certain embodiments thereof, those skilled in the art will appreciate that the invention is not limited to these embodiments and changes, modifications, and the like can be made therein within the scope of the invention as set forth in the appended claims.

I claim:

1. A method of strengthening a fired, porous ceramic investment casting core comprising:

impregnating the fired, porous ceramic investment casting core with an aqueous emulsion of a water-insoluble polymer, and drying the impregnated core to remove water.

2. The method of claim 1 wherein the water-insoluble polymer is selected from the group consisting of acrylic, styrene butadiene, polyvinyl acetate, styrene acrylic, vinyl acetate acrylic, vinyl-vinylidene chloride, epoxy, polyvinyl butyrol, and polyurethane.

3. The method of claim 1 wherein the aqueous emulsion comprises about 10% to about 60% of said water-insoluble polymer and balance essentially water.

4. The method of claim 1 wherein the aqueous emulsion comprises about 10% to 50% by weight of an acrylic polymer and balance essentially water.

5. The method of claim 4 wherein the acrylic polymer has a glass transition temperature from 15 to 40 degrees C.

6. The method of claim 4 wherein the aqueous emulsion comprises about 15% to 30% by weight of an acrylic polymer and balance essentially water.

7. The method of claim 4 wherein the acrylic polymer is self cross-linkable.

8. The method of claim 4 wherein the aqueous emulsion includes a cross linker for the water-insoluble polymer.

9. The method of claim 1 wherein the impregnating of the fired, porous investment casting core is achieved by immersing the core in the aqueous emulsion.

10. The method of claim 1 wherein the drying of the impregnated core is achieved by convection at superambient temperature.

11. A method of strengthening a fired, porous ceramic investment casting core comprising impregnating the fired porous ceramic investment casting core with an aqueous emulsion of a water-insoluble acrylic polymer and drying the impregnated core to remove water.

12. A method of strengthening a fired, porous ceramic core having an airfoil shaped region for use in investment casting, comprising:

impregnating the fired, porous ceramic core having the airfoil shaped region with an aqueous emulsion of a water-insoluble polymer, and drying the impregnated core to remove water.

13. A method of strengthening a fired, porous ceramic core having an airfoil shaped region for use in investment casting, comprising impregnating the fired, porous ceramic core having the airfoil shaped region with an aqueous emulsion of a water-insoluble acrylic polymer and drying the impregnated core to remove water.

* * * * *